Oct. 24, 1972 E. T. LONG 3,700,446

PROCESS FOR MANUFACTURE OF STRIPLINE CIRCUIT MODULES

Filed June 22, 1970

*INVENTOR.*
ERNEST T. LONG
*BY* ROY MILLER
ATTORNEY.
GERALD F. BAKER
AGENT.

3,700,446
PROCESS FOR MANUFACTURE OF STRIPLINE CIRCUIT MODULES

Ernest T. Long, China Lake, Calif., assignor to the United States of America as represented by the Secretary of the Navy Filed June 22, 1970, Ser. No. 48,354
Int. Cl. G03c 5/00
U.S. Cl. 96—362 3 Claims

ABSTRACT OF THE DISCLOSURE

Precision guidelines are added to the original layout of stripline circuit modules and the lines are used in subsequent steps to provide accurate alignment of the negative with a premachined circuit plate in the etching of the plate and also in subsequent inspection, etc.

BACKGROUND OF THE INVENTION

Generally the production of stripline circuit modules is accomplished by first making a large layout of Mylar vellum with as great accuracy as possible, usually within about ±.001 inch. The layout is then reduced by photographic process yielding a reduction negative of about (−10×). The negative is placed over a copper clad dielectric plate and the layout is photoetched on the plate and the plate is processed—removing any copper cladding not required for circuitry.

This process presents many problems of alignment which in the past have resulted in misalignment of circuitry in the finished module. Since these modules must be accurately aligned with other modules and with components added after the photoetching, misalignment of only a few thousandths of an inch can result in an unuseable part.

By this invention a process has been developed which eliminates much of the problem in the alignment of the plate and photonegative and thus results in a much greater percentage of accurately aligned finished modules.

Figure 1:
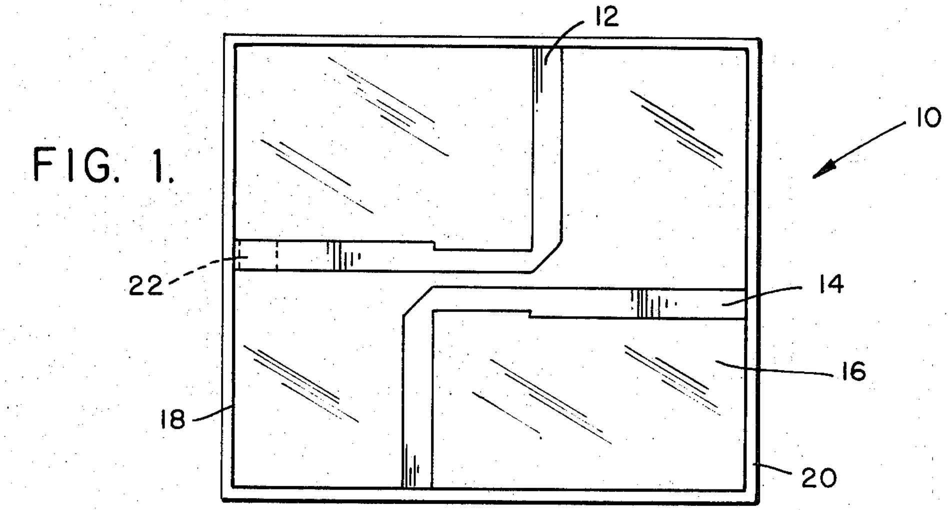
FIGS. 1 through 4 are plan views of layouts for use in manufacturing four different circuit module elements.

Each of the figures on the drawing illustrate different circuit module elements and appear in approximately the same size as the finished reduced negative. The layout 10 shown in FIG. 1 will, when in the negative form have portions 12 and 14 transparent and area 16 opaque. Also the guideline 18 will be transparent and the area 20 outside of line 18 will be opaque. The line 18 is very precisely placed with respect to conductors 12 and 14 and the inner edge of line 18 in the finished negative should exactly match the outer edge of a finished circuit plate. The plate prepared from such a negative would have area 16 free of any metal and areas 12 and 14 left with conductive material thereon. When two such plates are placed together with the metal conductors touching in sandwich form, a small square of conductive contact material such as gold or the like is usually placed at contact areas, such as indicated by dotted line 22, to complete the circuit.

Figures 2, 3:
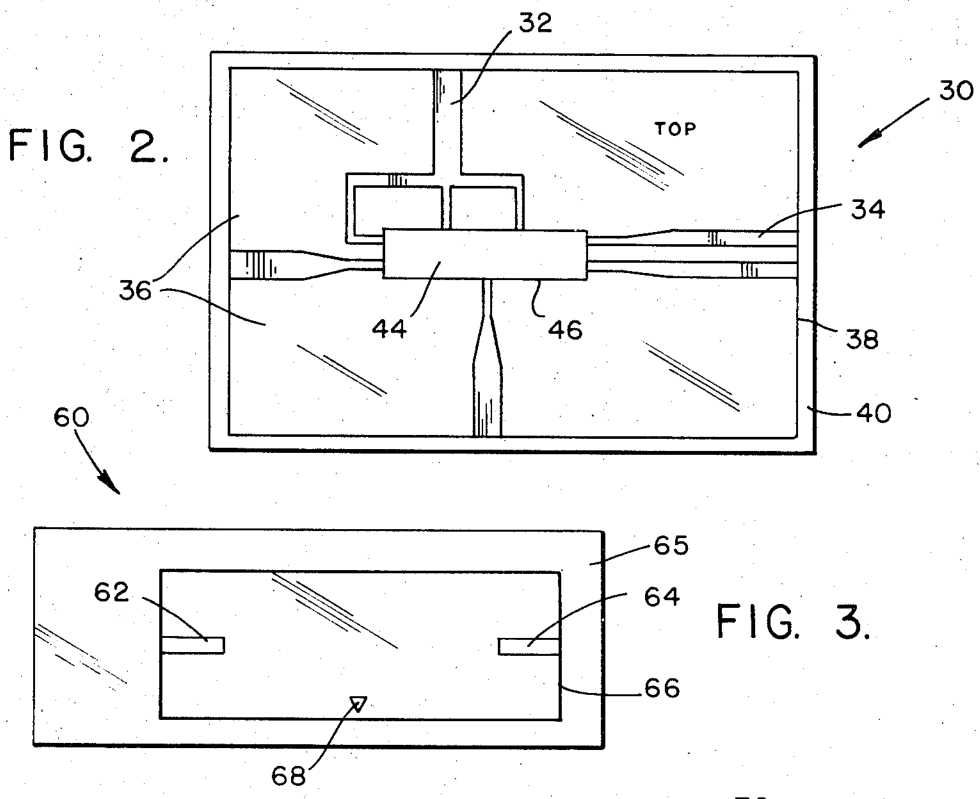

In FIG. 2 the layout 30 has the area 36 free of metal and the areas 32, 34 with metal retained in the finished product. The guideline 38 would be transparent in the negative and the area 40 outside of the guideline opaque. The area 40 being opaque, no metal is left on the finished product within this area. Guideline 46, however, is again transparent and a thin line of conductive material would be left after etching. The metal left at 46 will be removed, however, in the final preparation of the circuit element in preparation to the fitting of an element in the area 44 to complete the assembly.

Figure 4:
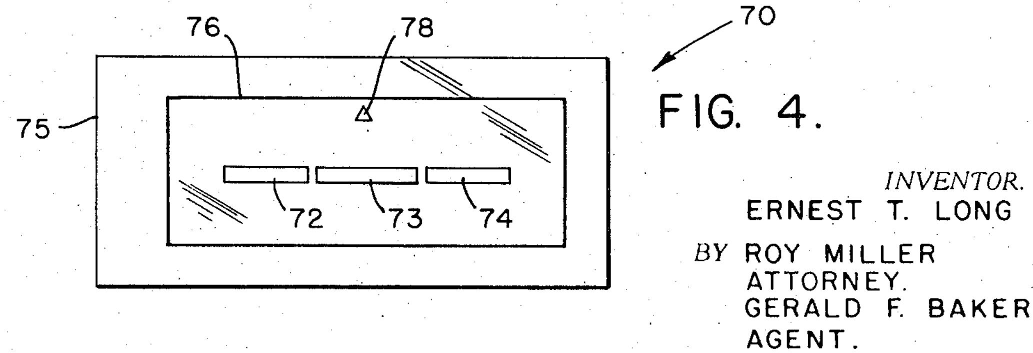

The layouts 60 and 70 (FIGS. 3 and 4, respectively) are two circuits from which the upper and lower halves of a complete stripline circuit will be manufactured. In FIG. 3 the areas 62, 64 will be the metal parts of the finished element while in FIG. 4 the portions 72, 73, 74 will be left. Guidelines 66 and 76 are in all respects congruent and indicia 68, 78 are so placed that when the finished plates are placed together with the markings 68, 78 together and the edges coinciding with lines 66, 76, respectively, aligned on all sides, then the conductor portion 62 and 64 of the one will overlie conductors 72, 74, respectively, of the other.

The boards or plates to be etched are premachined (preferably by grinding) so that the edges are precisely the dimension of the inner edge of the guideline on the negative and when the negative is placed over the plate with all of the transparent line showing, the alignment is correct.

What is claimed is:

1. In a process wherein a reduced photonegative is made of an original layout and the photonegative used to etch a metallic coated insulation plate to form, for example, a stripline circuit element;

the improvement comprising:

adding a peripheral guideline of finite thickness to the layout such that the inner edge of the line appearing in the reduced negative coincides in all respects to the outer dimensions of a finished plate;

premachining said plate to exact finished size; and using said guidelines to accurately align the negative with said plate for the etching step.

2. The process of claim 1 wherein one or more further guidelines are included in the layout within the boundary of said peripheral guidelines.

3. The process of claim 1 wherein one or more marks of orientation are included in the original layout and remain on said plate after etching.

References Cited

UNITED STATES PATENTS 3,171,741 3/1965 Meyer ---------- 96—36.2

FOREIGN PATENTS 1,185,027 3/1970 Great Britain -------- 96—36.2

J. TRAVIS BROWN, Primary Examiner
E. C. KIMLIN, Assistant Examiner